United States Patent [19]

Ohbuchi et al.

[11] Patent Number: 5,585,617
[45] Date of Patent: Dec. 17, 1996

[54] NON-CONTACT IC CARD COMMUNICATING AT MULTIPLE FREQUENCIES

[75] Inventors: Jun Ohbuchi; Shigeru Furuta; Tetsuro Washida, all of Itami, Japan

[73] Assignee: Mitsubishi Denki Kabushiki Kaisha, Tokyo, Japan

[21] Appl. No.: 499,907

[22] Filed: Jul. 11, 1995

[30] Foreign Application Priority Data

Jul. 13, 1994 [JP] Japan ................................ 6-161500

[51] Int. Cl.⁶ ........................................ G06K 19/06
[52] U.S. Cl. ...................... 235/491; 235/492; 455/193.1; 455/290
[58] Field of Search ........................ 235/492, 472, 235/380; 343/745; 455/193.1, 193.2, 193.3, 290

[56] References Cited

U.S. PATENT DOCUMENTS

| | | | |
|---|---|---|---|
| 4,353,064 | 10/1982 | Stamm | 340/825.31 |
| 4,381,566 | 4/1983 | Kane | 455/193 |
| 4,506,148 | 3/1985 | Berthold et al. | 235/380 |
| 4,620,194 | 10/1986 | Bel Moratalla | 343/747 |
| 4,815,032 | 3/1989 | Fujii | 364/900 |
| 4,816,656 | 3/1989 | Nakano et al. | 235/380 |
| 5,070,233 | 12/1991 | Takizawa et al. | 235/380 |
| 5,157,247 | 10/1992 | Takahira | 235/492 |
| 5,175,418 | 12/1992 | Tanaka | 235/439 |
| 5,182,442 | 2/1993 | Takahira | 235/492 |
| 5,220,158 | 6/1993 | Takahira et al. | 235/492 |

FOREIGN PATENT DOCUMENTS 5-67254  3/1993  Japan .

OTHER PUBLICATIONS

Vincent Cordonnier, Smart Cards: Present And Future Applications And Techniques, Oct. 1991, pp. 207–211.
Ken–Ichi Konno, Toshiyuki Haga, Takagumi Kimura 2.45 GHZ Antennas Developed For Wireless Card Communications System, 1993 vol. 2, pp. 13–14–13–17.

Primary Examiner—Donald T. Hajec
Assistant Examiner—Dong Q. Luong
Attorney, Agent, or Firm—Leydig, Voit, Mayer

[57] ABSTRACT

A non-contact IC card capable of communicating with external equipment at various communication frequencies. An antenna circuit of variable frequency and a frequency switching circuit for supplying communication clock signals of variable frequency to a modulator-demodulator circuit are provided so that communication is performed by switching a constant of the antenna circuit and the frequency of the communication clock signal generated from the frequency switching circuit in accordance with the frequency of external equipment with which communication is effected.

4 Claims, 6 Drawing Sheets

NON-CONTACT IC CARD COMMUNICATING AT MULTIPLE FREQUENCIES

FIELD OF THE INVENTION

The present invention relates to a non-contact IC card that includes a battery and is capable of data communication with an external device, such as a terminal, card reader/writer, etc, using electromagnetic waves.

DESCRIPTION OF THE RELATED ART

FIG. 7 is a block diagram showing the construction of a conventional non-contact IC card, i.e., the one disclosed in Japanese Patent Laid-Open (Kokai) No. Hei. 5-67254. In this figure, a non-contact IC card (hereinafter referred to as a card) 1 includes a CPU 2 for data processing; a ROM 3, a non-volatile memory, for storing a program 3a for the CPU 2; a RAM 4, a volatile memory, for storing data; a battery 5 power supply for the respective circuits; an input-output circuit 6 for parallel-to-serial conversion and serial-to-parallel conversion of data; and a bus 7 interconnecting the ROM 3, RAM 4, and CPU 2.

Further, a modulator-demodulator circuit 8 modulates a transmitted signal and demodulates a received signal. A transmitting circuit 9 drives an antenna circuit 10 for signal transmission. The antenna circuit 10 converts an electrical signal into electromagnetic waves for transmission from the card and receives electromagnetic waves from an external source as an electrical signal. A receiving circuit 11 converts the signal received as an analog signal into a digital signal. Further, an oscillating element 12 and an oscillation circuit 13 generate a clock signal at a predetermined reference frequency as an internal clock signal used in operation of the card. A broken line 50 represents a circuit substrate for mounting a semiconductor chip (not shown) including the respective component parts described above and a coil of the antenna circuit 10. Connections of the oscillation circuit 13 and the battery 5 with the respective circuits are not shown.

Electromagnetic waves at a predetermined frequency transmitted from an external unit are received at the antenna circuit 10 and converted into a received, analog signal. The received signal is then applied to the receiving circuit 11. A threshold value VTH, for example, is set at the receiving circuit 11 and, in accordance with the threshold, the analog signal is directly converted into a received digital signal. The digital signal is then applied to the modulator-demodulator circuit 8 from the receiving circuit 11, demodulated, and applied to the input-output circuit 6 in a form expanded to a predetermined 1-bit width. The output of the receiving circuit 11 may also be used as a trigger signal T for starting operation of the CPU 2.

While the signal is treated as a serial signal in the portion of the antenna circuit 10 through the modulator-demodulator circuit 8, the received serial signal is converted into a parallel signal at the input-output circuit 6. The data converted into the parallel signal is then input to the CPU 2 via the bus 7. CPU 2 processes the data in accordance with the program 3a stored in the ROM 3. Further, data is stored in the RAM 4.

Basically, a conversion reverse to that at the time of reception is performed at the time of transmission. Data to be sent to an external unit is input to the input-output circuit 6 via the bus 7. The data consisting of a parallel signal is converted into a serial signal at the input-output circuit 6 and is input to the modulator-demodulator circuit 8. Modulation based on the transmission data of a digital signal is performed at the modulator-demodulator circuit 8 and the transmitting circuit 9 drives the antenna circuit 10 based on the modulated transmission signal to transmit electromagnetic waves.

The antenna circuit 10 is a resonant circuit (not shown) including a coil and a capacitor having a predetermined resonance frequency at the transmission and the receiving frequency (inclusively referred to as the communication frequency) of an external unit. Further, taking into account the communication frequency of the external unit, a clock signal for communication is obtained, for example, by dividing by a predetermined divisor the reference frequency clock signal generated by the oscillation circuit 13, and supplied to the modulator-demodulator circuit 8, transmitting circuit 9, and receiving circuit 11 so that they are respectively operated based on that signal.

In the conventional non-contact IC card as described, since the communication frequency of the antenna circuit and the frequency of the communication clock signal supplied to the modulator-demodulator circuit, transmitting circuit, and receiving circuit are fixed, communication is possible only at a single, predetermined frequency. Since applications of non-contact IC cards are now increasing with further applications expected in the future, the limitation on communication due to the fixed communication frequency significantly narrows the range of applications of non-contact IC cards. Accordingly, if a user is to utilize a plurality of non-contact card systems using the conventional non-contact IC card, a separate card is required for each of the systems or electromagnetic waves must be transmitted at a plurality of frequencies by each system to match various cards.

SUMMARY OF THE INVENTION

To solve the problems described above, it is an object of the present invention to provide a non-contact IC card for communicating with external devices at different communication frequencies.

A non-contact IC card communicating at a plurality of frequencies comprises a battery power supply; data processing/storage means for processing and storage of data; a frequency-variable antenna circuit switching communication frequency, receiving electromagnetic waves from an external source and converting them into a received signal, and converting a transmission signal into electromagnetic waves for transmission; clock generation means for generating a clock signal at a reference frequency; variable communication clock generation means for dividing the clock signal to generate communication clock signals at a plurality of frequencies respectively corresponding to the communication frequencies of the antenna circuit; and communication control means connected between the antenna circuit and the data processing/storage means for converting a received signal into data and for converting data to be transmitted into a transmission signal in accordance with the communication clock signal from the variable communication clock generation means and for transmission and reception through the antenna circuit.

In accordance with a second aspect of the present invention, the frequency-variable antenna circuit comprises one coil, a plurality of capacitors of different capacitances, and a first switching section for connecting a selected one of the plurality of capacitors in parallel with the coil; and the variable communication clock generation means comprises a frequency dividing circuit for dividing by different frequency dividing factors the reference frequency clock signal from the clock generation means to generate communication clock signals at different frequencies and a second switching section for selectively supplying communication clock signals generated by the frequency dividing circuit to the communication control means.

In accordance with a third aspect of the present invention, the data processing/storage means, frequency variable antenna circuit, clock generation means, variable communication clock generation means and communication control means are located on a single circuit substrate and each of the first and second switching sections comprises a plurality of short-circuiting pins for effecting desired connections on the substrate and a chip jumper for selectively connecting these short-circuit pins.

In accordance with a fourth aspect of the present invention, the data processing/storage means, frequency-variable antenna circuit, clock generation means, variable communication clock generation means and communication control means are located on a circuit substrate and each of the first and second switching sections comprises a switch operated from outside of the card.

In the first aspect of the invention, the frequency-variable antenna circuit and the variable communication clock generation means for supplying a communication clock signal of variable frequency to the communication control means are provided for communication with a plurality of external devices of different frequencies.

In the second aspect of the invention, switching sections are provided at the frequency-variable antenna circuit and the variable communication clock generation means, respectively, so that the communication frequency of the antenna circuit and the frequency of the communication clock signal are switched at these switching sections.

In the third aspect of the invention, each of the switching sections of the frequency-variable antenna circuit and the variable communication clock generation means includes a plurality of short-circuit pins on a circuit substrate for effecting desired connections and a chip jumper for selectively connecting these short-circuit pins, achieving a card which may be manufactured relatively easily at a low manufacturing cost.

In the fourth aspect of the invention, each of the switching sections of the frequency-variable antenna circuit and the variable communication clock generation means includes a switch operated from outside of the card, achieving a card in which the communication frequency may be suitably switched.

DESCRIPTION OF THE PREFERRED EMBODIMENTS

Embodiment 1

Figure 1:
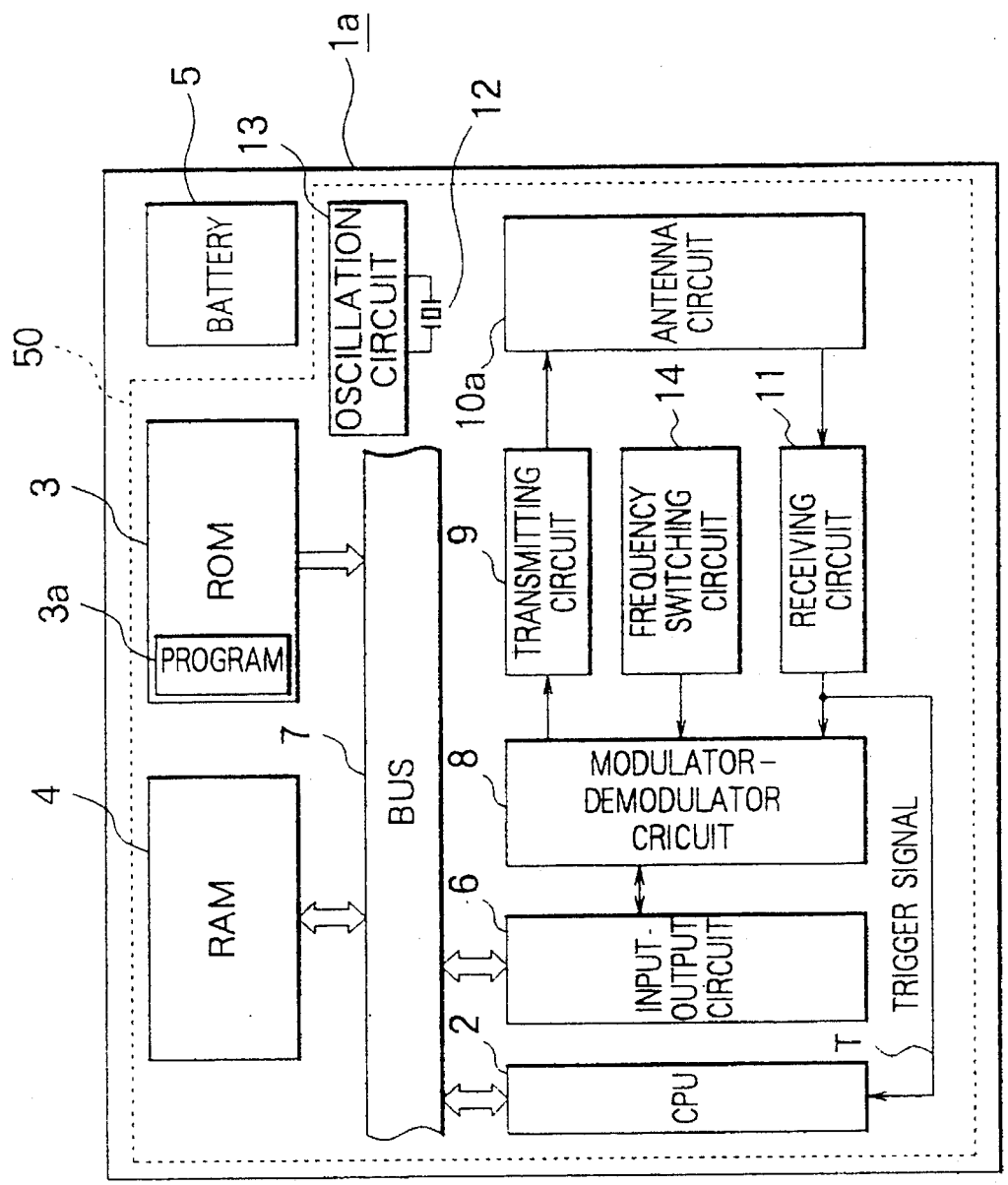
FIG. 1 is a block diagram showing the construction of a non-contact IC card according to an embodiment of the present invention.

FIG. 1 is a block diagram showing the construction of a non-contact IC card according to an embodiment of the present invention. A card 1a of FIG. 1 includes a CPU 2 for data processing; a ROM 3, a non-volatile memory, for storing a program 3a for the CPU 2; a RAM 4, a volatile memory, for storing data; a battery 5 power supply for the respective circuits; an input-output circuit 6 for parallel-to-serial conversion and serial-to-parallel conversion of data; and a bus 7 interconnecting the ROM 3, RAM 4, and CPU 2.

Further, a modulator-demodulator circuit 8 modulates a transmission signal and demodulates a received signal. A transmitting circuit 9 drives a frequency-variable antenna circuit 10a based on a transmission signal to transmit electromagnetic waves. The frequency-variable antenna circuit 10a has a variable communication frequency, described later, and converts a transmission signal into electromagnetic waves for transmission from the card and for receiving electromagnetic waves as a received signal, both at a switched communication frequency. A receiving circuit 11 converts the received signal from an analog signal to a digital signal.

Further, oscillating element 12 and an oscillation circuit 13 generate a clock signal having a reference frequency for generating an internal clock signal used in operation of the card. A frequency switching circuit 14 is described later. A broken line 50 represents a circuit substrate for mounting a semiconductor chip (not shown) including the respective component parts described above, a coil of the antenna circuit 10a, etc.

The antenna circuit 10a is a frequency-variable antenna circuit (hereinafter referred to as antenna circuit) of which the communication frequencies for receiving and transmitting are changeable. Further, the frequency switching circuit 14 selectively supplies communication clock signals at a plurality of frequencies by dividing the clock signal from the oscillation circuit 13 to vary carrier and demodulating wave frequencies for the transmitting circuit 9, receiving circuit 11, and the modulator-demodulator circuit 8.

The CPU 2, ROM 3, RAM 4, and bus 7 are part of the data processing/storage means; the antenna circuit 10a is part of the frequency-variable antenna circuit; the oscillating element 12 and the oscillation circuit 13 are part of the clock generation means; the frequency switching circuit 14 is part of the communication variable clock generation means; and the input-output circuit 6, the modulator-demodulator circuit 8, the transmitting circuit 9, and receiving circuit 11 are part of the communication control means.

Figure 2:
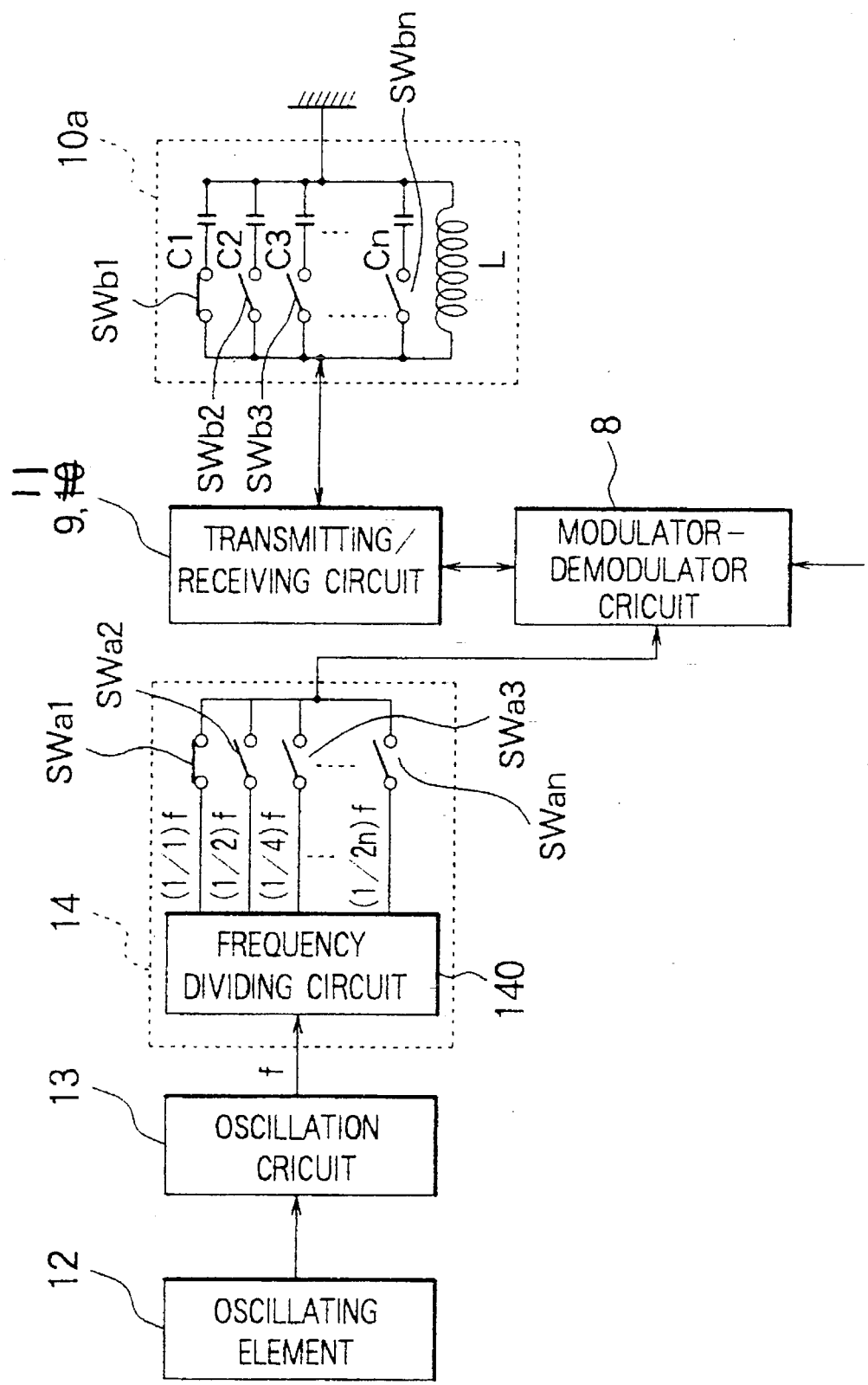
FIG. 2 is a block diagram showing the construction of the portions of the card of FIG. 1 related to communication.

The construction of the communication portions of the card 1a of FIG. 1 are shown in FIG. 2 as a block diagrams. The frequency switching circuit 14 includes a frequency dividing circuit 140 for generating communication clock signals at frequencies of $(1/2)f$, $(1/4)f$, ... $(1/2n)f$, respectively, obtained by dividing the reference frequency f from the oscillation circuit 13 by a desired frequency divisor and a group of frequency selecting switches SWa1 to SWan for selectively supplying the clock signals to the modulator-demodulator circuit 8.

Further, the antenna circuit 10a includes a coil L, a plurality of capacitors C1 to Cn of different capacitances, and a group of constant changing switches SWb1 to SWbn for connecting a selected one of the capacitors C1 to Cn in parallel with the coil L to change the resonance frequency of the antenna circuit 10a.

The fundamental operation of the card in transmission/reception is similar to that of the conventional card. If, in receiving, the signal transmitted from an external unit (not shown) is at a frequency of F1, only the switch SWb1 is closed so that the capacitor C1 for $F1=1/(2\pi\sqrt{LC})$ (L: inductance of coil, C: capacitance of capacitor), the condition for a resonance at the antenna circuit 10a, is connected in parallel with the coil L. The other switches SWb2 to SWbn are open. An analog signal having the frequency F1 generated by the antenna circuit 10a is converted into a digital signal by the receiving circuit 11.

The frequency selecting switch Swa1, for example, is closed by the frequency switching circuit 14 to selectively derive the frequency to be generated at the frequency dividing circuit 140. The other switches SWa2 to SWan are open.

Thereafter, the received digital signal from the receiving circuit 11 is removed from the carrier component in the modulator-demodulator circuit 8 and is expanded to a previously set 1-bit width based on the output signal of the frequency switching circuit 14 and converted into data consisting of parallel signals at the input-output circuit 6 and is delivered to the CPU 2 via the bus 7.

On the other hand, in order that communication is effected at the previously set frequency when data within the card is to be transmitted to an external unit, transmission is performed with the switch SWa1 and the switch SWb1 closed, respectively, in the frequency switching circuit 14 and the antenna circuit 10a.

In this manner, by providing the antenna circuit 10a, the communication frequency may be switched by changing the antenna, and the frequency switching circuit 14 for changing the frequency of the communication clock signal supplied to the modulator-demodulator circuit 8, communication with a plurality of external equipment having different communication frequencies is possible. Unlike the conventional system, it is not necessary to provide a separate card for each equipment.

Embodiment 2

Figure 3:
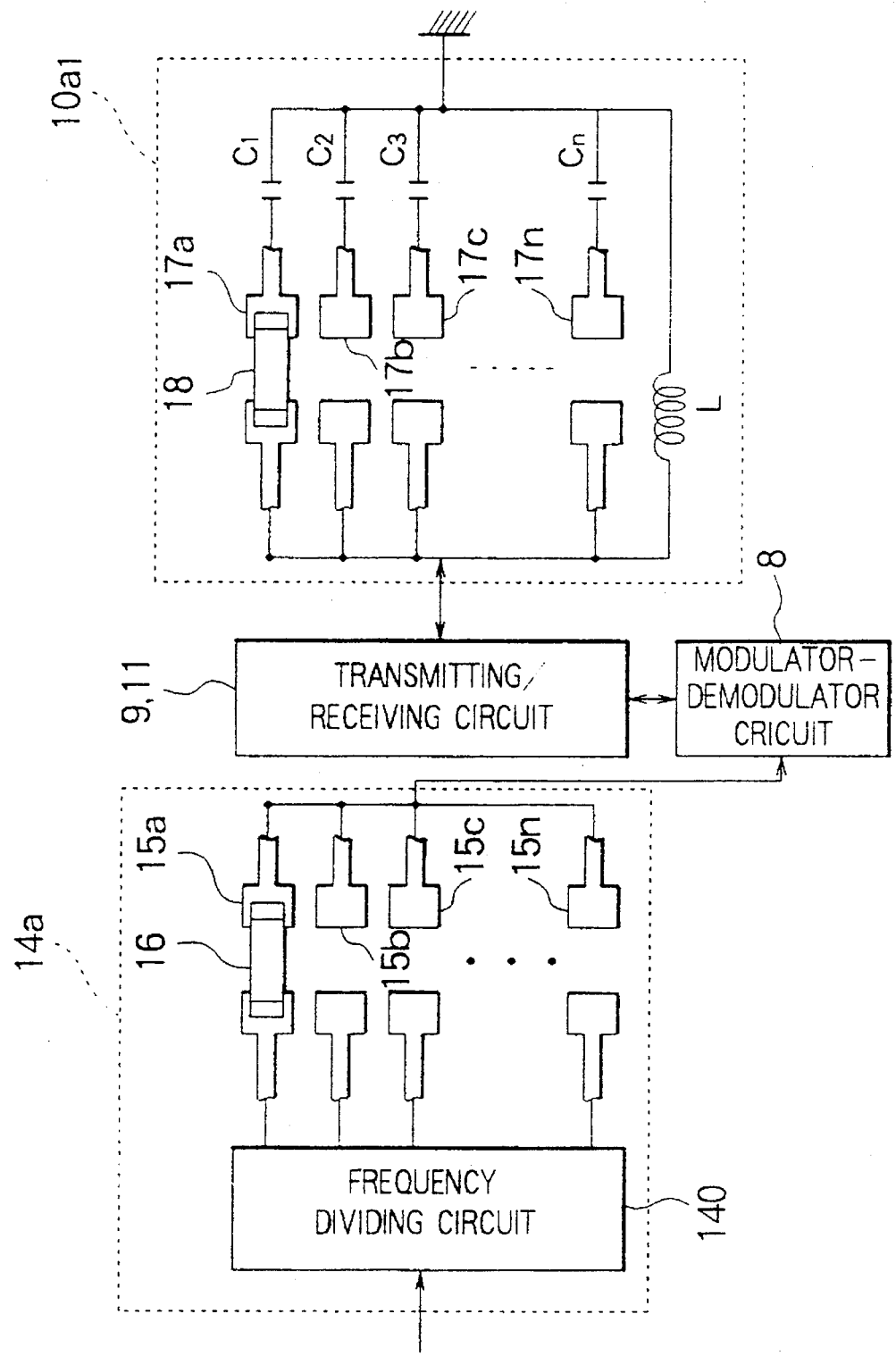
FIG. 3 shows a specific example of the antenna circuit and frequency switching circuit off FIG. 2.

Shown in FIG. 3 is a specific embodiment of the antenna circuit 10a and the frequency switching circuit 14 of FIG. 2. In this embodiment, the switch groups (the first and second switching sections) of the antenna circuit 10a and the frequency switching circuit 14 each include a plurality of short-circuit pins 15 and 17 on a substrate and chip jumpers 16 and 18 for electrically connecting short-circuit pins.

In the frequency switching circuit 14a of FIG. 3, one of the short-circuit pins 15a to 15n is connected to a respective output of the frequency dividing circuit 140 and to the transmitting circuit 9, receiving circuit 11, and modulator-demodulator circuit 8 by means of a chip jumper 16. In FIG. 3, the chip jumper 16 is connected to the short-circuit pin 15a.

Similarly, in the antenna circuit 10a1, short-circuit pins 17a to 17n are connected to the plurality of capacitors C1 to Cn, respectively, and connected in parallel with the coil L by means of a chip jumper 18. In FIG. 3, the chip jumper 18 is connected to the short-circuit pin 17a.

The card constructed in this manner is capable of responding to external equipment having a desired frequency by simply connecting the chip jumpers 16 and 18 to suitable short-circuit pins 15a to 15n and 17a to 17n at the time of manufacturing the card, so that the card may be manufactured relatively easily and at a low manufacturing cost.

Embodiment 3

Figure 4:
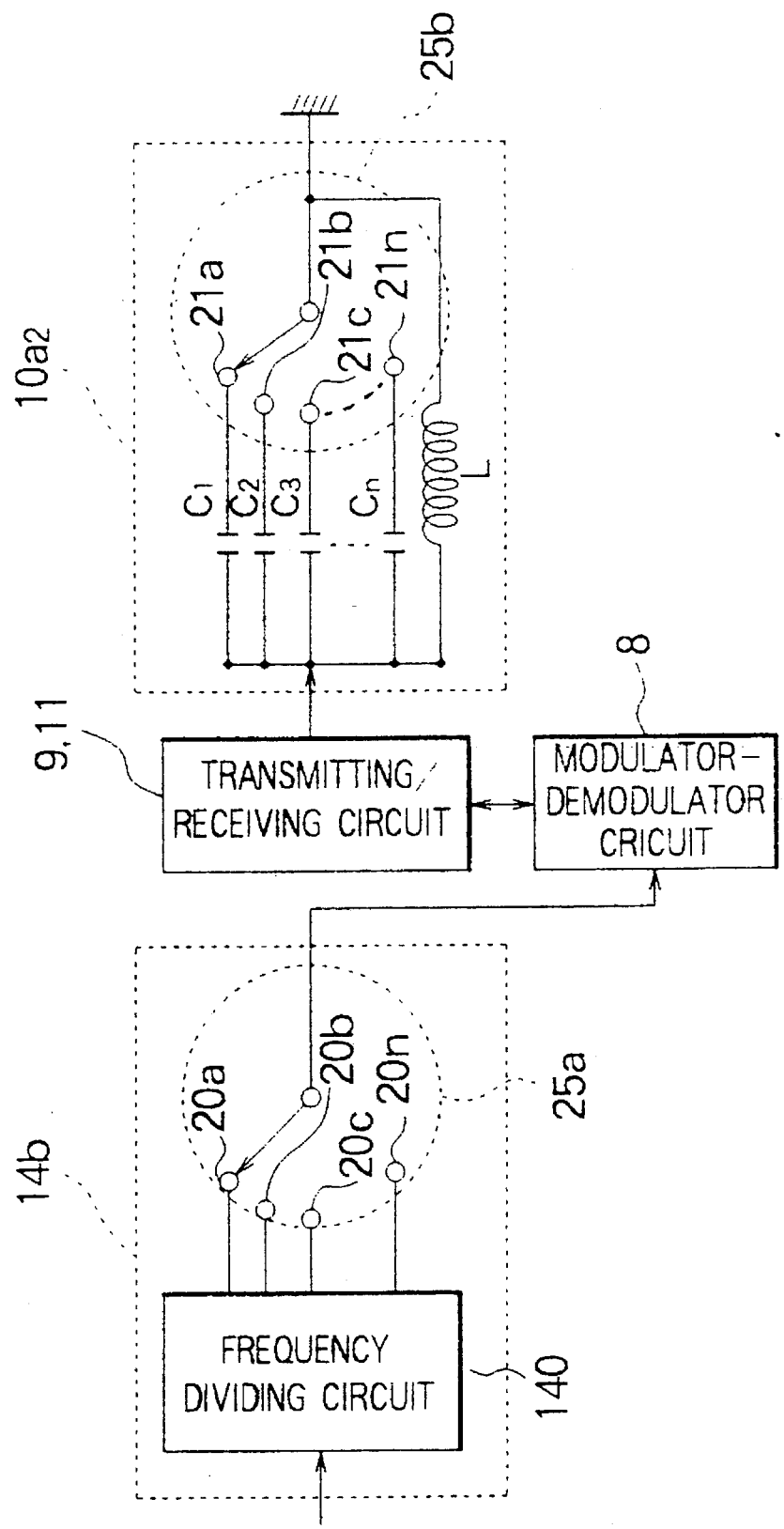
FIG. 4 shows another specific example of the antenna circuit and frequency switching circuit of FIG. 2.
Figure 5:
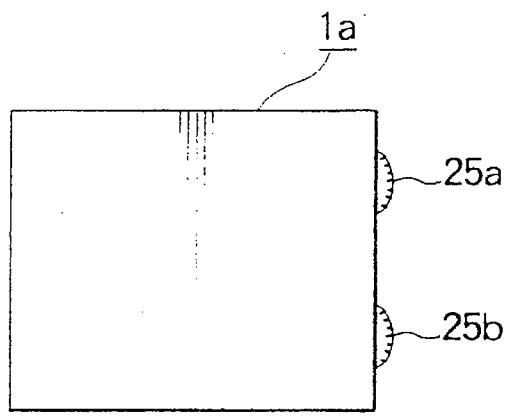
FIG. 5 shows the external appearance of the card of the embodiment of FIG. 4.

Shown in FIG. 4 is another specific embodiment of the antenna circuit 10a and the frequency switching circuit 14 of FIG. 2. In this embodiment, the switch groups of the antenna circuit 10a and the frequency switching circuit 14 respectively include switches operated from outside of the card. FIG. 4 shows an example where the switches are rotary switches 25a and 25b. Further, FIG. 5 shows the external appearance of a card 1a with this construction.

In the frequency switching circuit 14b of FIG. 4, the rotary switch 25a operated from outside of the card is provided for selectively connecting the respective output terminals 20a to 20n of the frequency dividing circuit 140 to the transmitting circuit 9, receiving circuit 11, and modulator-demodulator circuit 8. In FIG. 4, the output terminal 20a is selected.

Similarly, in the antenna circuit 10a2, the rotary switch 25b, also operated from outside of the card, is provided for selectively connecting one of the plurality of capacitors C1 to Cn to the coil L. In FIG. 4, a terminal 21a is selected and the capacitor C1 is connected in parallel with the coil L.

Figure 6:
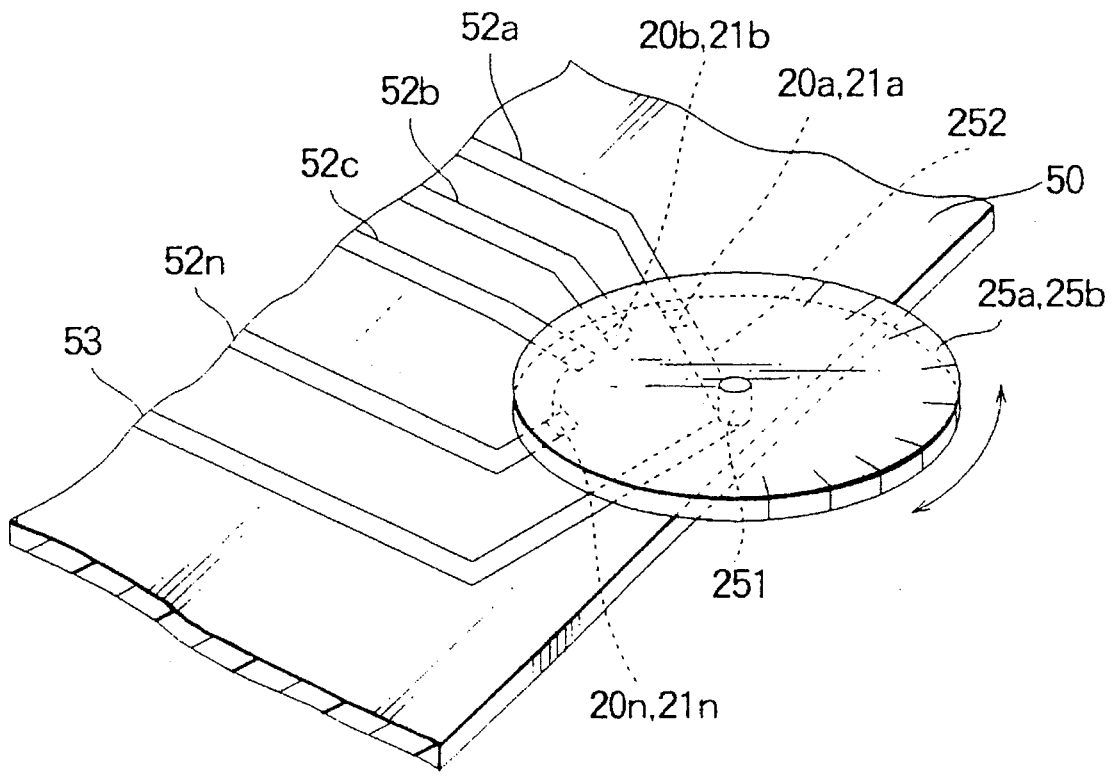
FIG. 6 is a perspective view showing an example of the rotary switch of the embodiment of FIG. 4.
Figure 7:
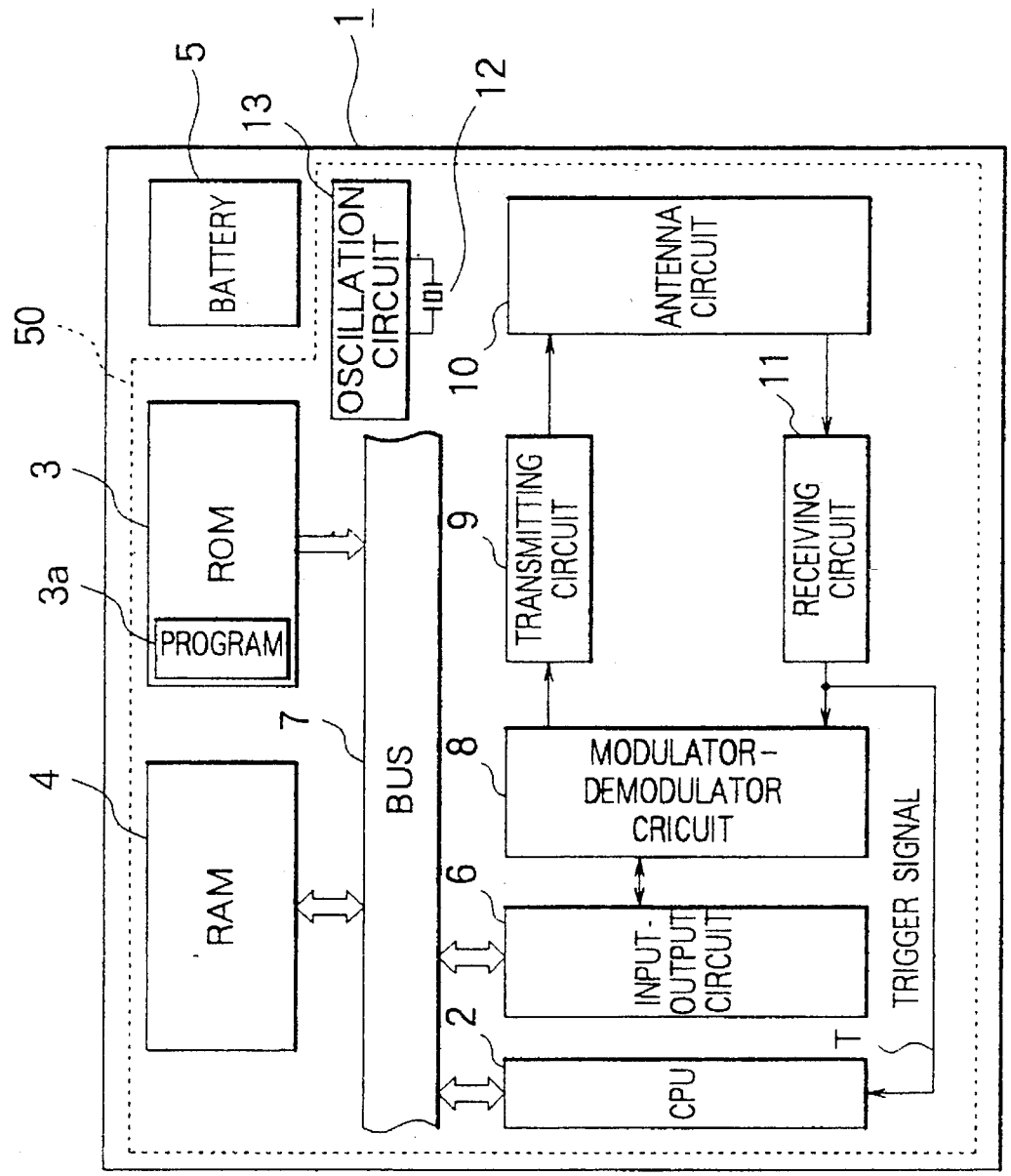
FIG. 7 is a block diagram showing the construction of a conventional non-contact IC card.

FIG. 6 shows a perspective view of an example of the rotary switches 25a and 25b on a circuit substrate 50. The rotary switches 25a and 25b each rotate about a rotating axle 251 and stop, being clicked, at each of the predetermined annular positions. A conductor 252 extends in the direction of a radius from the rotating axle 251 on the lower surface of the rotary switches 25a and 25b. On the other hand, on the upper surface of the circuit substrate 50 are conductor patterns 52a to 52n respectively connected to the outputs of the frequency dividing circuit 140 or to one end of the capacitors C1 to Cn, and a conductor pattern 53 connected to the communication control means including the transmitting circuit 9, etc., or to one end of the coil L. Terminals 20a to 20n and 21a to 21n are provided on the respective conductor patterns 52a to 52n at their ends toward the rotary switch. Further, an end of the conductor pattern 53 toward the rotary switch is electrically connected via the rotating axle 251 to the conductor 252.

When the rotary switches 25a and 25b are rotated, the distal end of the conductor 252 on their lower surfaces is selectively connected to the terminals 20a to 20n and 21a to 21n of the conductor patterns 52a to 52n. Thereby, the communication clock signal at a desired frequency is supplied to the transmitting circuit 9 by the frequency switching circuit 14b, while, in the antenna circuit 10a2, the coil L and the selected capacitor are connected in parallel with each other to achieve a desired resonance frequency.

With the card constructed as described, switching of the communication frequency from outside of the card is possible, whereby communication may be effected by suitably switching the communication frequency in accordance with its application and the card has a high versatility in communicating with a plurality of external units at different frequencies.

The switch operated from outside of the card as described is not limited to a rotary switch and similar advantages may be achieved by toggle switches, slide switches, etc.

As has been described, in the first aspect of the invention, the frequency-variable antenna circuit and the variable communication clock generation means for supplying a variable-frequency communication clock signal to the communication control means are provided so that the communication frequency may be changed; a versatile non-contact IC card for communicating with a plurality of external devices at different frequencies is thereby provided.

In the second aspect of the invention, switching sections are provided at the frequency-variable antenna circuit and the variable communication clock generation means, respectively, so that the communication frequency of the antenna circuit and the frequency of the communication clock signal are switched at these switching sections, whereby a non-contact IC card for communication at different frequencies is provided.

Since, in the third aspect of the invention, the respective switching sections of the frequency-variable antenna circuit and the variable communication clock generation means are a plurality of pins on a circuit substrate and a chip jumper for selectively connecting these pins, an inexpensive non-contact IC card that may be manufactured relatively easily at a low cost is provided.

Since, in the fourth aspect of the invention, the respective switching sections of the frequency-variable antenna circuit and the variable communication clock generation means are switches operated from outside of the card, a non-contact IC card for communication by suitably switching communication frequency is provided.

What is claimed is:

1. A non-contact IC card for communication at a plurality of frequencies comprising:

a battery serving as a power supply;

data processing and storage means for processing and storage of data;

a frequency-variable antenna circuit for switching communication frequency, said antenna circuit receiving electromagnetic waves from an external source, converting them into a received electrical signal, and converting an internally generated electrical signal into electromagnetic waves for transmission;

clock generation means for generating a clock signal at a reference frequency;

variable communication clock generation means for dividing the reference frequency of the clock signal to selectively generate communication clock signals at a plurality of different frequencies respectively corresponding to communication frequencies of said antenna circuit; and communication control means connected between said antenna circuit and said data processing and storage means for converting a received signal into data and data to be transmitted into a transmission signal in accordance with the communication clock signals from said variable communication clock generation means.

2. The non-contact IC card according to claim 1, wherein said frequency-variable antenna circuit comprises a coil; a plurality of capacitors of different capacities; and a first switching section for selectively connecting one of the plurality of capacitors in parallel with said coil; and wherein said variable communication clock generation means comprises a frequency dividing circuit for dividing by different factors the reference frequency clock signal from said clock generation means to generate a plurality of communication clock signals at different frequencies; and a second switching section for selectively supplying one of the plurality of communication clock signals generated at the frequency dividing circuit to said communication control means.

3. The non-contact IC card according to claim 2 wherein said data processing and storage means, frequency-variable antenna circuit, clock generation means, variable communication clock generation means, and communication control means are formed on a circuit substrate and each of said first and second switching sections comprises a plurality of short-circuit pins for effecting a desired connection, formed on said circuit substrate, and a chip jumper for selectively connecting pairs of the short-circuit pins.

4. The non-contact IC card according to claim 2 wherein said data processing and storage means, frequency-variable antenna circuit, clock generation means, variable communication clock generation means, and communication control means are formed on a circuit substrate and each of said first and second switching sections comprises a switch operable from outside of the card.

* * * * *